US008750931B2

(12) United States Patent
Park et al.

(10) Patent No.: US 8,750,931 B2
(45) Date of Patent: Jun. 10, 2014

(54) APPARATUS AND METHOD FOR AUTOMATIC SIM CARD SELECTION ACCORDING TO NETWORK ENVIRONMENT IN DUAL MODE

(75) Inventors: Se-Hee Park, Suwon-si (KR); Sun-Ho Hwang, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 267 days.

(21) Appl. No.: 13/095,214

(22) Filed: Apr. 27, 2011

(65) Prior Publication Data

US 2011/0269503 A1 Nov. 3, 2011

(30) Foreign Application Priority Data

Apr. 30, 2010 (KR) ........................ 10-2010-0040831

(51) Int. Cl.
*H04M 1/00* (2006.01)

(52) U.S. Cl.
USPC ..................................... 455/558; 455/552.1

(58) Field of Classification Search
USPC .......... 455/432.1, 432.2, 432.3, 552.1, 553.1, 455/558
See application file for complete search history.

(56) References Cited

U.S. PATENT DOCUMENTS

| 5,999,811 | A  | * | 12/1999 | Molne .......................... 455/432.3 |
| 6,185,436 | B1 | * | 2/2001  | Vu .................................. 455/558 |
| 7,003,319 | B1 | * | 2/2006  | Howell et al. ................. 455/558 |
| 2003/0125073 | A1 | * | 7/2003 | Tsai et al. ..................... 455/552 |
| 2005/0075106 | A1 | * | 4/2005 | Jiang ........................ 455/432.3 |
| 2005/0096087 | A1 | * | 5/2005 | Kim ................................ 455/558 |
| 2005/0181829 | A1 | * | 8/2005 | Cho et al. ...................... 455/558 |
| 2007/0184858 | A1 | * | 8/2007 | Landschaft et al. .......... 455/466 |
| 2008/0020773 | A1 | * | 1/2008 | Black et al. .................... 455/445 |
| 2008/0256621 | A1 | * | 10/2008 | Casimere et al. ............... 726/14 |
| 2008/0318621 | A1 | * | 12/2008 | Fan et al. .................... 455/552.1 |
| 2009/0061932 | A1 | * | 3/2009 | Nagarajan ..................... 455/558 |
| 2009/0312020 | A1 | * | 12/2009 | Lee ............................. 455/435.2 |
| 2009/0325572 | A1 | * | 12/2009 | Ji .................................. 455/424 |
| 2010/0009716 | A1 | * | 1/2010 | Lee et al. ...................... 455/558 |
| 2010/0105433 | A1 | * | 4/2010 | Lin et al. ....................... 455/558 |
| 2010/0240414 | A1 | * | 9/2010 | Lotenberg ..................... 455/558 |
| 2010/0317403 | A1 | * | 12/2010 | Mizuo ........................... 455/558 |
| 2011/0117964 | A1 | * | 5/2011 | Luo ................................ 455/558 |
| 2011/0212724 | A1 | * | 9/2011 | Wirtanen et al. ........... 455/435.2 |
| 2012/0238323 | A1 | * | 9/2012 | Camilleri et al. ............. 455/558 |

* cited by examiner

*Primary Examiner* — Christopher M Brandt
(74) *Attorney, Agent, or Firm* — Jefferson IP Law, LLP

(57) ABSTRACT

A dual mode terminal including two Subscriber Identity Module (SIM) cards and a method for automatically selecting a SIM card according to network environment in the dual mode terminal is provided. The method includes switching a master/slave setting when a SIM card setting change condition is met in a standby state, and setting a network of a switched SIM card as a master network.

20 Claims, 6 Drawing Sheets

APPARATUS AND METHOD FOR AUTOMATIC SIM CARD SELECTION ACCORDING TO NETWORK ENVIRONMENT IN DUAL MODE

PRIORITY

This application claims priority under 35 U.S.C. §119 of a Korean patent application filed in the Korean Intellectual Property Office on Apr. 30, 2010 and assigned Serial No. 10-2010-0040831, the entire disclosure of which is hereby incorporated by reference.

BACKGROUND OF THE INVENTION

1. Field of the Invention

The present invention relates to a dual mode terminal including two or more Subscriber Identity Module (SIM) cards. More particularly, the present invention relates to an apparatus and method for automatically selecting a network with a good network environment or a preferred network according to a network state in a dual mode terminal having two or more SIM cards.

2. Description of the Related Art

A dual mode terminal can be equipped with two or more Subscriber Identity Module (SIM) cards of different providers or the same provider. In general, a user can set a master SIM card and a slave SIM card by using a terminal's menu.

The user receives a mobile communication service by preferentially requesting the mobile communication service by using the master SIM card that is set as a default.

The setting of the master SIM card and the slave SIM card, which is conducted by the user through the terminal's menu, is a fixed setting, and the current set values are continuously maintained as long as the user does not change the set values manually through the menu.

Accordingly, under environments where the user cannot receive a service by the use of the master SIM card, the user cannot receive a mobile communication service unless the setting is switched manually.

Therefore, a need exists for an apparatus and method for automatically selecting a SIM card in a dual mode terminal according to a network environment.

SUMMARY OF THE INVENTION

Aspects of the present invention are to address at least the above-mentioned problems and/or disadvantages and to provide at least the advantages described below. Accordingly, an aspect of the present invention is to provide an apparatus and method for automatically selecting a Subscriber Identity Module (SIM) card according to network environment in a dual mode terminal.

Another aspect of the present invention is to provide an apparatus and method for allowing a user to receive a desired service by switching a slave SIM card and a master SIM card when the use of a mobile communication system employing the master SIM card is not possible or a preferred mobile communication service cannot be provided by the use of the master SIM card.

Still another aspect of the present invention is to provide an apparatus and method for providing a user's convenience and use of a $3^{rd}$ Generation (3G) network by inducing a user to switch a master network to a slave network when a master SIM card using the 3G network cannot reliably access a 3G network signal and it is determined that a slave SIM card using a $2^{nd}$ Generation (2G) network can reliably access the 3G network signal.

According to an aspect of the present invention, a method for automatically selecting a SIM card according to a network environment in a dual mode terminal is provided. The method includes switching a master/slave setting when a SIM card setting change condition is met in a standby state, and setting a network of a switched SIM card as a master network.

According to another aspect of the present invention, an apparatus for automatically selecting a SIM card according to a network environment in a dual mode terminal is provided. The apparatus includes a first modem for communicating with a master network, a second modem for communicating with a slave network, and a control unit for switching a master/slave setting when a SIM card setting change condition is met in a standby state, and for setting a network of a switched SIM card as a master network.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will become more apparent from the following description taken in conjunction with the accompanying drawings, in which.

Throughout the drawings, like reference numerals will be understood to refer to like parts, components and structures.

DETAILED DESCRIPTION OF THE EXEMPLARY EMBODIMENTS

Figure 1:
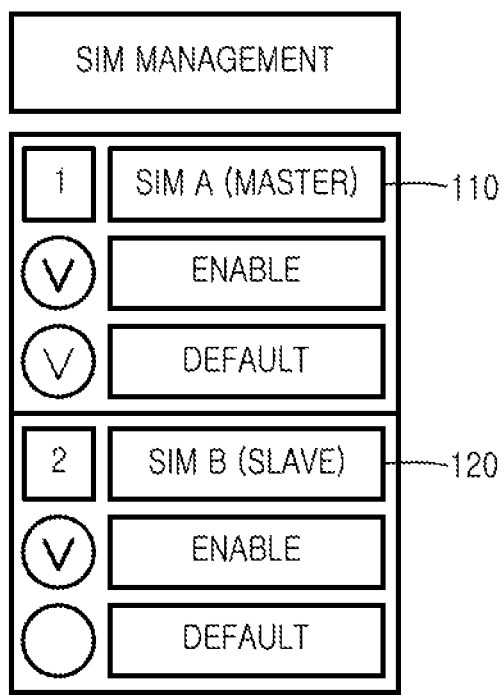
FIG. 1 is a diagram illustrating a user interface screen for a manual Subscriber Identity Module (SIM) card selection according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

FIGS. 1 through 6, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

Hereinafter, an apparatus and method for automatically selecting a Subscriber Identity Module (SIM) card according to network environment in a dual mode terminal will be described.

The dual mode terminal is used to receive a mobile communication service through a specific network by use of a SIM card, or receive services from two service providers at the same time by switching the SIM card to a user's desired service providers.

The user uses two or more SIM cards for various purposes. For example, the user uses two or more SIM cards to select a network having a low service rate because each network has a different service rate, use a network while differentiating between a private business and a public business, or use several networks through which better services can be provided. Hence, the user may want to use a SIM card of a specific network according to the user's desired purpose by switching a setting of a master SIM card and a slave SIM card.

FIG. 1 is a diagram illustrating a user interface screen for a manual SIM card selection according to an exemplary embodiment of the present invention.

Referring to FIG. 1, a SIM A 110 and a SIM B 120 are displayed on a SIM management screen for a manual SIM card selection according to the exemplary embodiment of the present invention. The SIM A 110 and the SIM B 120 are a master and a slave, respectively. A user may enable or disable the SIM A 110 and the SIM B 120.

Figure 2:
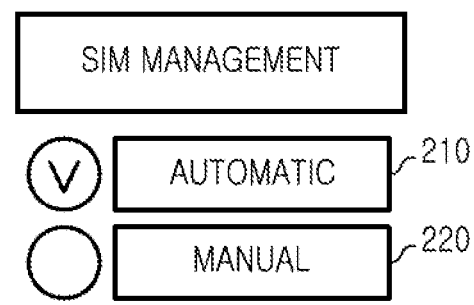
FIG. 2 is a diagram illustrating a user interface screen for an automatic SIM card switching setting according to an exemplary embodiment of the present invention.

FIG. 2 is a diagram illustrating a user interface screen for an automatic SIM card switching setting according to an exemplary embodiment of the present invention.

Referring to FIG. 2, unlike the user interface screen of FIG. 1, an "automatic" item 210 and a "manual" item 220 are displayed on a SIM management menu. The user selects the automatic item 210 when he or she wants a SIM card selecting function according to the exemplary embodiment of the present invention. On the other hand, the user selects the manual item 220 when he or she wants a manual setting.

When the user selects the manual item 220, he or she is allowed to enable or disable the master SIM card and the slave SIM card as illustrated in FIG. 1.

An operation of automatically selecting a SIM card according to an exemplary embodiment of the present invention will be described below.

For example, in a case in which a mobile terminal includes SIM cards of A and B networks and a user sets the SIM card of the A network as a master and the SIM card of the B network as a slave, the SIM card of the B network and the SIM card of the A network are automatically switched to the master and the slave, respectively, upon movement to an area where no A network exists or an area where the network environment of the A network has a weak electric field or a mobile communication service is not available.

Figure 3:
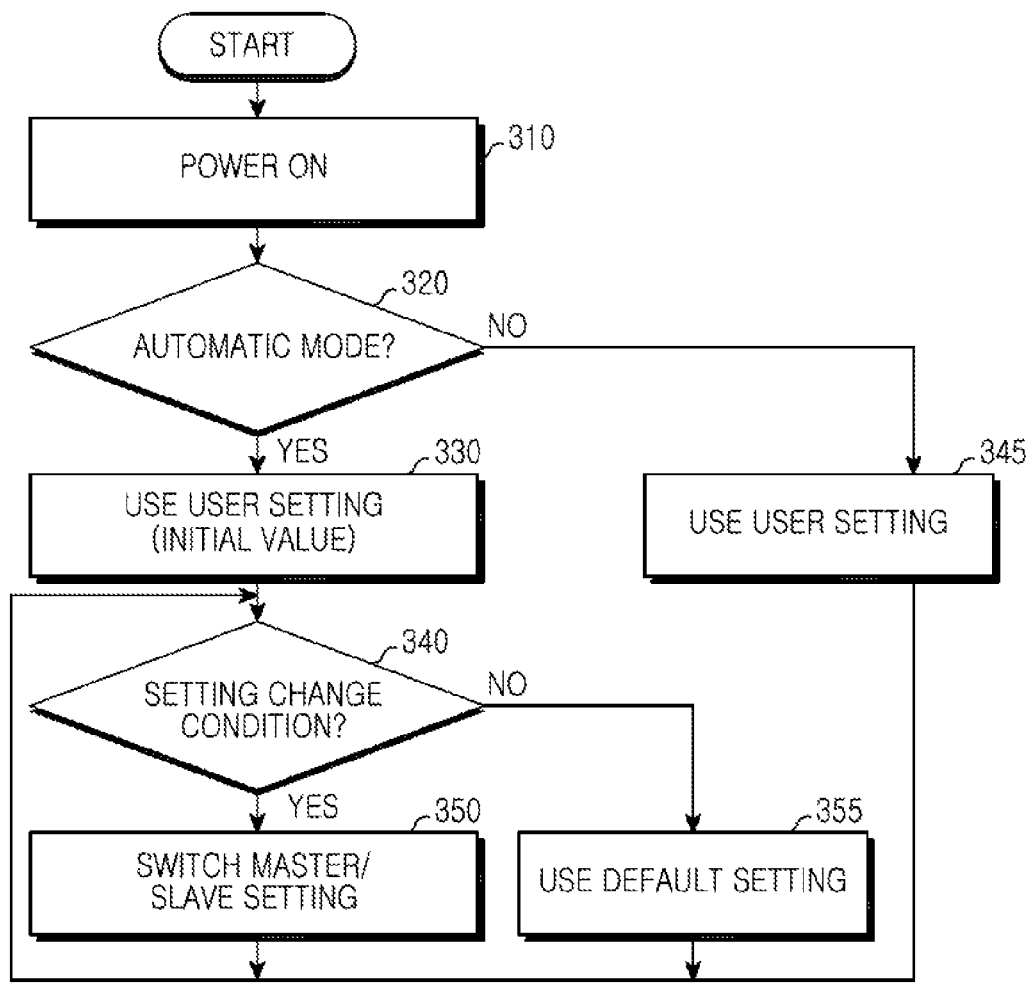
FIG. 3 is a flowchart illustrating an automatic SIM card switching process according to an exemplary embodiment of the present invention.

FIG. 3 is a flowchart illustrating an automatic SIM card switching process according to an exemplary embodiment of the present invention.

Referring to FIG. 3, after the dual mode terminal according to the exemplary embodiment of the present invention is powered on in step 310, it determines whether an automatic SIM card switching mode is currently set in step 320. The automatic SIM card switching mode corresponds to the automatic item 210 illustrated in FIG. 2.

If it is determined in step 320 that the automatic SIM card switching mode is set, the dual mode terminal uses a user setting as an initial value in step 330 and thereafter uses the automatic switching mode.

The user setting has values that are initially set to the dual mode terminal, that is, set values that determine whether the master SIM card and the slave SIM card are enabled or disabled, and determine which SIM cards are set as the master and the slave, as in the case of FIG. 1.

Then, the dual mode terminal determines whether the current state of the dual mode terminal meets a SIM card setting change condition in step 340. The SIM card setting change condition will be described below with reference to FIG. 4.

If it is determined in step 340 that the current state of the dual mode terminal meets the SIM card setting change condition, the dual mode terminal changes the master/slave setting in step 350. That is, the master/slave setting is switched. Thereafter, the network of the switched master SIM card is set as a master network.

If it is determined in step 340 that the current state of the dual mode terminal does not meet the SIM card setting change condition, the dual mode terminal operates based on the current master/slave setting in step 355.

If it is determined in step 320 that the automatic SIM card switching mode is not set, the dual mode terminal uses the user setting as the initial value in step 345 and maintains the current setting.

The user setting has values that are initially set to the dual mode terminal, that is, set values that determine whether the master SIM card and the slave SIM card are enabled or disabled, and determine which SIM cards are set as the master and the slave, as in the case of FIG. 1.

The currently set values are continuously maintained until the state of the dual mode terminal meets the SIM card setting change condition. After the dual mode terminal is powered off, the set values may be reset or maintained according to users, manufacturers, or service providers. The master SIM card represents a SIM card that is presently used.

Figure 4:
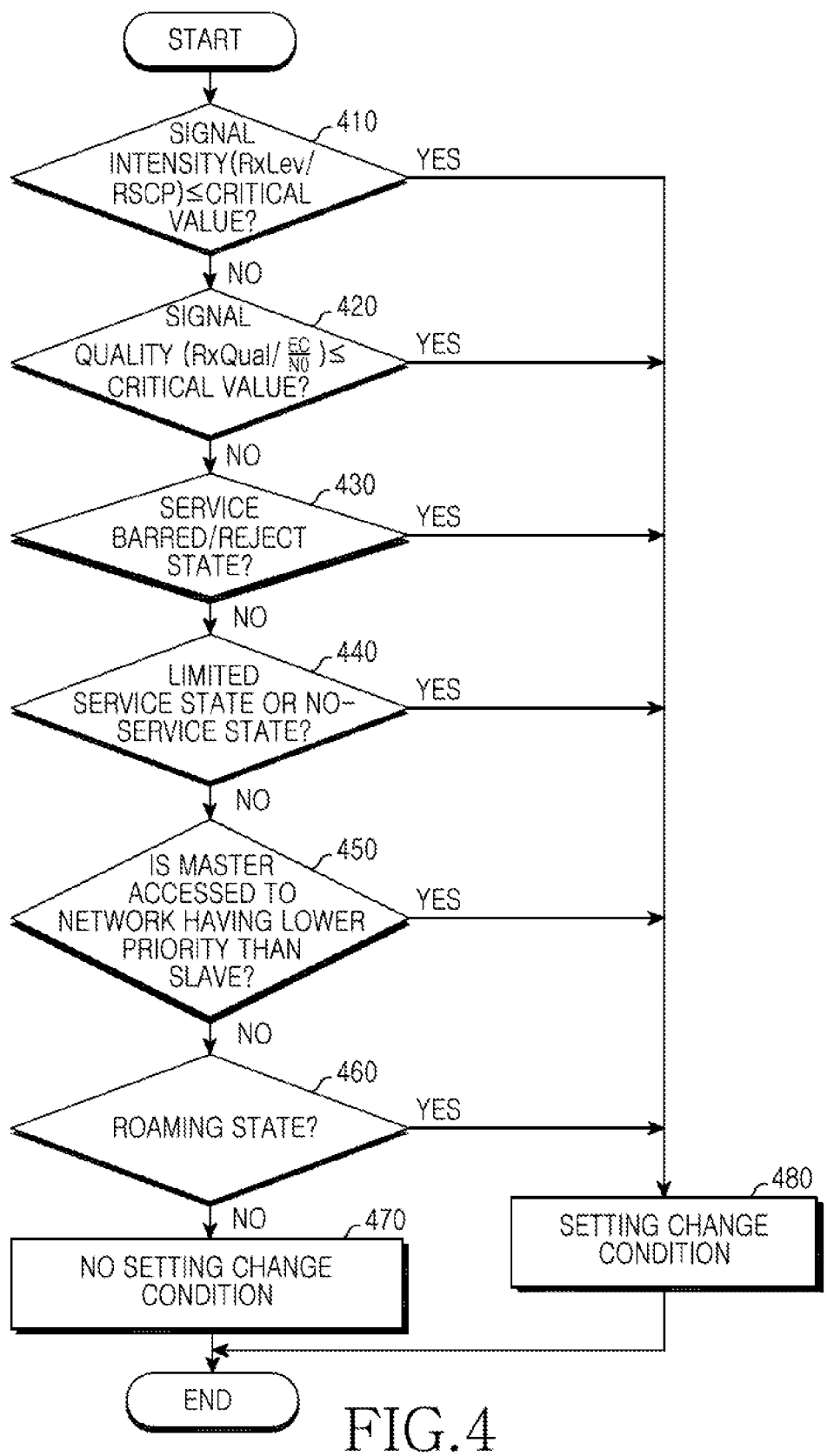
FIG. 4 is a flowchart illustrating a SIM card setting change condition according to an exemplary embodiment of the present invention.

FIG. 4 is a flowchart illustrating a SIM card setting change condition according to an exemplary embodiment of the present invention.

Referring to FIG. 4, a SIM card setting change condition considering network environment is illustrated. When signal intensity (RxLev/RSCP) of an accessed master network is equal to or less than a critical value (which may be set by a terminal manufacturer) in step 410, it is determined as meeting the SIM card setting change condition in step 480.

When the signal quality (RxQual/(Ec/No)) of the accessed master network is equal to or less than a critical value (which may be set by a terminal manufacturer) in step 420, it is determined as meeting the SIM card setting change condition in step 480.

When the accessed master network is in a service barred/reject state in step 430, it is determined as meeting the SIM card setting change condition in step 480.

When the master network is in a limited service state or a no-service state in step 440, it is determined as meeting the SIM card setting change condition in step 480.

When the master network is not a network having higher priority than the slave network in step 450, for example, when the master network is a $2^{nd}$ Generation (2G) network and the slave network is a $3^{rd}$ Generation (3G) network, it is determined as meeting the SIM card setting change condition in step 480.

When the master network is a network to which the terminal is roaming in step 460, it is determined as meeting the SIM card setting change condition in step 480.

Other cases are determined as not meeting the SIM card setting change condition in step 470.

Figure 5:
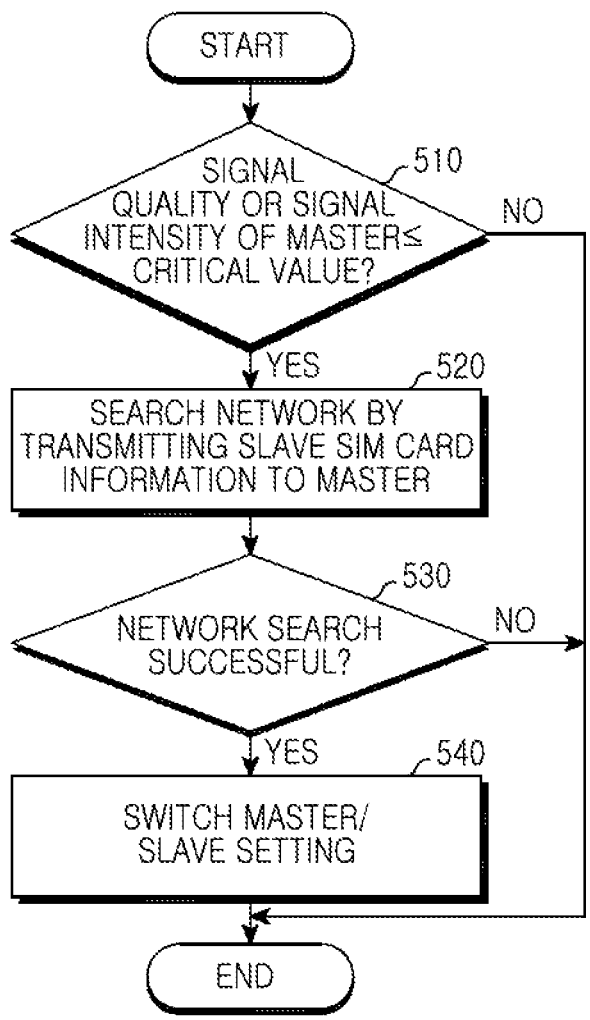
FIG. 5 is a flowchart illustrating a master/slave switching process according to an exemplary embodiment of the present invention.

FIG. 5 is a flowchart illustrating a master/slave switching process according to an exemplary embodiment of the present invention.

In the process of FIG. 5, it is assumed that both of the master SIM card and the slave SIM card are accessible to 2G and 3G networks.

Referring to FIG. 5, when the signal intensity or the signal quality of the master network (e.g., 3G), is equal to or less than a critical value in step 510, slave SIM card information is transmitted to the master SIM card and a network search is performed in step 520. In this case, the slave SIM card can access the 3G network, but it is assumed that the slave SIM card is set to access the 2G network.

In step 520, since the slave SIM card that is using the 2G network cannot search for a 3G network by using a 2G baseband, the slave SIM card information is transmitted to the master SIM card and the 3G network search is performed.

When the network search is successful in step 530, the master/slave setting is switched in step 540.

Figure 6:
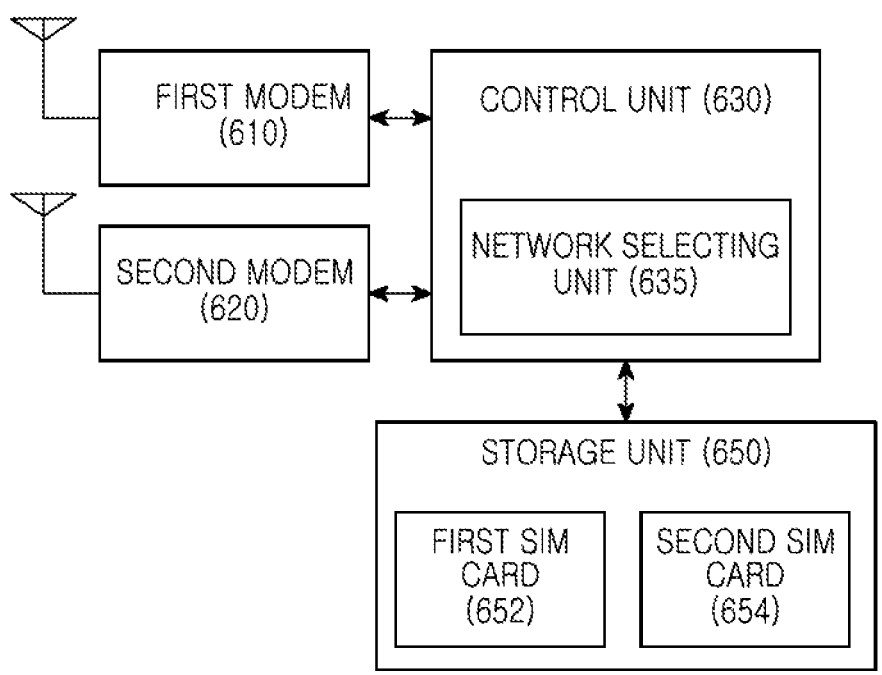
FIG. 6 is a block diagram illustrating a dual mode terminal architecture according to an exemplary embodiment of the present invention.

FIG. 6 is a block diagram illustrating a dual mode terminal architecture according to an exemplary embodiment of the present invention.

Referring to FIG. 6, the dual mode terminal includes a first modem 610, a second modem 620, a control unit 630, and a storage unit 650. The control unit 630 includes a network selecting unit 635, and the storage unit 650 includes a first SIM card 652 and a second SIM card 654.

The first modem 610 and the second modem 620 are modules for communicating with other devices. Each of the first modem 610 and the second modem 620 includes a Radio Frequency (RF) processing unit and a baseband processing unit. The RF processing unit converts a signal received through an antenna into a baseband signal, and provides the baseband signal to the baseband processing unit. In addition, the RF processing unit converts the baseband signal from the baseband processing unit into an RF signal that is transmittable on an actual wireless path, and transmits the RF signal through the antenna. There is no specific limit to wireless access technologies of the first modem 610 and the second modem 620. That is, the wireless access technologies are not limited to 2G technology, 3G technology, $4^{th}$ Generation (4G) technology, Worldwide Interoperability for Microwave Access (WIMAX) technology, and Wireless Local Area Network (WLAN) technology, and, if necessary, they may be selectively used.

The control unit 630 controls operations of the dual mode terminal For example, the control unit 630 processes and controls a voice call and a packet communication. More particularly, the control unit 630 controls the network selecting unit 635 according to the exemplary embodiment of the present invention.

The storage unit 650 stores a program that controls operations of the dual mode terminal. In addition, the storage unit 650 stores temporary data generated during execution of the program. More particularly, the storage unit 650 according to the exemplary embodiment of the present invention includes the first SIM card 652 and the second SIM card 654.

When the first SIM card 652 is the master, the second SIM card 654 becomes the slave. When the first SIM card 652 is the slave, the second SIM card 654 becomes the master.

The network selecting unit 635 performs the master/slave switching process described above with reference to FIGS. 3 to 5.

After the dual mode terminal is powered on, the network selecting unit 635 determines whether the automatic SIM card switching mode is currently set. The automatic SIM card switching mode corresponds to the automatic item 210 of FIG. 2.

When the automatic SIM card switching mode is set, the network selecting unit 635 uses the user setting of the dual mode terminal as an initial value and thereafter uses the automatic switching mode.

The user setting has values that are initially set to the dual mode terminal, that is, set values that determine whether the master SIM card and the slave SIM card are enabled or disabled, and determine which SIM cards are set as the master and the slave, as in the case of FIG. 1.

The network selecting unit 635 determines whether the current state of the dual mode terminal meets the SIM card setting change condition.

When the current state of the dual mode terminal meets the SIM card setting change condition, the network selecting unit 635 changes the master/slave setting. That is, the network selecting unit 635 switches the master/slave setting.

When the current state of the dual mode terminal does not meet the SIM card setting change condition, the dual mode terminal operates based on the current master/slave setting.

When the automatic SIM card switching mode is not set, the network selecting unit 635 uses the user setting as the initial value and maintains the current setting.

The network selecting unit 635 continuously maintains the set values until the state of the dual mode terminal meets the SIM card setting change condition. After the dual mode terminal is powered off, the set values may be reset or maintained according to users, manufacturers, or service providers.

When signal intensity (RxLev/RSCP) of an accessed master network is equal to or less than a critical value, the network selecting unit 635 determines this case as meeting the SIM card setting change condition.

When signal quality (RxQual/(Ec/No)) of the accessed master network is equal to or less than a critical value, the network selecting unit 635 determines this case as meeting the SIM card setting change condition.

When the accessed master network or slave network is in a service barred/reject state, the network selecting unit 635 determines this case as meeting the SIM card setting change condition.

When the master network or the slave network is in a limited service state or a no-service state, the network selecting unit 635 determines this case as meeting the SIM card setting change condition.

When the master network is not a network having higher priority than the slave network, for example, when the master network is a 2G network and the slave network is a 3G network, the network selecting unit 635 determines this case as meeting the SIM card setting change condition.

When the master network is a network to which the terminal is roaming, the network selecting unit 635 determines this case as meeting the SIM card setting change condition.

When the signal quality of the master network (e.g., 3G) is equal to or less than a critical value, the network selecting unit 635 transmits slave SIM card information to the master SIM card and performs a network search.

When the network search is successful, the network selecting unit 635 switches the master/slave setting.

In the above-described block configuration, the control unit 630 may be designed to perform functions of the network selecting unit 635. The control unit 630 and the network selecting unit 635 are separately illustrated in order to describe their functions separately.

Therefore, when the dual mode terminal according to the exemplary embodiments of the present invention is implemented as an actual product, the control unit 630 may be configured to process all or some of the functions of the network selecting unit 635.

Since the dual mode terminal automatically switches the master SIM card and the slave SIM card according to the network environment, the user can receive higher-quality services and seamless mobile communication services under better communication environments.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for selecting a Subscriber Identity Module (SIM) card in a dual mode terminal, the method comprising:
   switching, by a control unit, a master/slave setting when a SIM card setting change condition is met in a standby state; and
   setting, by the control unit, a network of a switched SIM card as a master network,
   wherein the meeting of the SIM card setting change condition is according to an accessed master network environment of the dual mode terminal,
   wherein the SIM card setting change condition comprises at least one condition of conditions comprising a signal intensity, a signal quality, a service barred/reject state, a limited service or no-service state, a priority, and the dual mode terminal in a roaming state, and
   wherein when a plurality of the conditions is evaluated, the conditions are evaluated sequentially.

2. The method of claim 1, further comprising:
   determining, by the control unit, whether an automatic mode for network selection is selected, after the dual mode terminal is powered on; and
   applying, by the control unit, a default setting for network selection when the automatic mode is selected.

3. The method of claim 1, wherein the SIM card setting change condition is met when a signal quality of the accessed master network is equal to or less than a critical value.

4. The method of claim 1, wherein the SIM card setting change condition is met when the accessed master network is in the service barred/reject state.

5. The method of claim 1, wherein the SIM card setting change condition is met when the accessed master network is in the limited service state or the no-service state.

6. The method of claim 1, wherein the SIM card setting change condition is met when the accessed master network has a lower priority than an accessed slave network.

7. The method of claim 1, wherein the SIM card setting change condition is met when the accessed master network is a network to which the dual mode terminal is connected in the roaming state.

8. The method of claim 1, further comprising:
   operating, by the control unit, the dual mode terminal based on a current master/slave setting, if the SIM card setting change condition is not met.

9. The method of claim 1, wherein the SIM card setting change condition is met when a signal intensity of the accessed master network is equal to or less than a critical value.

10. A method for selecting a Subscriber Identity Module (SIM) card in a dual mode terminal, the method comprising:
    switching, by a control unit, a master/slave setting when a SIM card setting change condition is met in a standby state;
    setting, by the control unit, a network of a switched SIM card as a master network;
    performing, by the control unit, a network search by transmitting slave SIM card information to a master SIM card when a signal quality of the master network is equal to or less than a critical value;
    switching, by the control unit, the master/slave setting when the network search is successful; and
    setting, by the control unit, a network of a switched SIM card as the master network.

11. A dual mode terminal comprising:
    a first modem for communicating with a master network;
    a second modem for communicating with a slave network; and
    a control unit for switching a master/slave setting when a SIM card setting change condition is met in a standby state, and for setting a network of a switched SIM card as a master network,
    wherein the meeting of the SIM card setting change condition is according to an accessed master network environment of the dual mode terminal,
    wherein the SIM card setting change condition comprises at least one condition of conditions comprising a signal intensity, a signal quality, a service barred/reject state, a limited service or no-service state, a priority, and the dual mode terminal in a roaming state, and
    wherein when a plurality of the conditions is evaluated, the conditions are evaluated sequentially.

12. The dual mode terminal of claim 11, wherein the control unit determines whether an automatic mode for network selection is selected, after the dual mode terminal is powered on, and applies a default setting for network selection when the automatic mode is selected.

13. The dual mode terminal of claim 11, wherein, when a signal quality of an accessed master network is equal to or less than a critical value, the control unit determines that the SIM card setting change condition is met.

14. The dual mode terminal of claim 11, wherein, when the accessed master network is in the service barred/reject state, the control unit determines that the SIM card setting change condition is met.

15. The dual mode terminal of claim 11, wherein, when the accessed master network is in the limited service state or the no-service state, the control unit determines that the SIM card setting change condition is met.

16. The dual mode terminal of claim 11, wherein, when the accessed master network has a lower priority than an accessed slave network, the control unit determines that the SIM card setting change condition is met.

17. The dual mode terminal of claim 11, wherein, when the accessed master network is a network to which the dual mode terminal is connected in the roaming state, the control unit determines that the SIM card setting change condition is met.

18. The dual mode terminal of claim 11, further comprising operating the dual mode terminal based on a current master/slave setting, if the SIM card setting change condition is not met.

19. The dual mode terminal of claim 11, wherein, when a signal intensity of an accessed master network is equal to or less than a critical value, the control unit determines that the SIM card setting change condition is met.

20. A dual mode terminal comprising:
- a first modem for communicating with a master network;
- a second modem for communicating with a slave network; and
- a control unit for switching a master/slave setting when a Subscriber Identity Module (SIM) card setting change condition is met in a standby state, setting a network of a switched SIM card as a master network, performing a network search by transmitting slave SIM card information to a master SIM card when a signal quality of the master network is equal to or less than a critical value, switching the master/slave setting when the network search is successful, and settings a network of a switched SIM card as a master network.

\* \* \* \* \*